— 2,798,812 —
— Patented July 9, 1957 —

2,798,812
PROCESS FOR IMPROVING COLOR OF ANIMAL MATERIAL

Alfred L. Savich, Chicago, and Clarence E. Jansen, Palos Heights, Ill., assignors to Swift & Company, Chicago, Ill., a corporation of Illinois No Drawing. Application June 8, 1953,
Serial No. 360,359

5 Claims. (Cl. 99—107)

This invention relates to an improvement in the processing of animal materials to obtain a more desirable color.

For some time it has been known that ascorbic acid could be used to stabilize the desirable bright red color commonly associated with fresh meat and to reinforce the vitamin content of the meat. However, tests have shown that ascorbic acid and its edible salts are ineffective in the color protection of meat stored at conventional refrigeration temperatures for periods longer than four to five days.

Meat contains a number of chromoproteins which are the oxygen-bearing pigments of the blood. Among these chromoproteins are myoglobin nad hemoglobin which are reduced forms of their respective pigments. Upon oxygenation, myoglobin and hemoglobin, which are purplish red, become bright red and are termed, respectively, oxymyoglobin and oxyhemoglobin. Oxidation of these oxy compounds results in metamyoglobin and methemoglobin which are an objectionable grayish brown in color. It is known that ascorbic acid acts as a reducing agent toward these grayish brown met compounds and converts them, respectively, to myoglobin and hemoglobin. The reduced pigments then take up oxygen from the air to give the desired bright red oxy compounds.

We have discovered that the color (i. e., the bright red of the oxy compounds) of meat may be protected considerably beyond that period which is presently possible with the addition of ascorbic acid alone through the combined use of ascorbic acid or one of its edible salts and an antibiotic capable of inhibiting bacterial growth of the meat. The antibiotics when added to meat without ascorbic acid do not prolong the bright red color life of the meat or blood.

The amounts of ascorbic acid and antibiotic required for color protection vary with the meat being processed and its form. Very satisfactory results have been obtained in the treatment of ground beef through the addition of 5–10 p. p. m. of chlortetracycline (commonly sold under the trademark Aureomycin) and 0.05 percent of ascorbic acid (or 0.05 to 0.1 percent of sodium ascorbate). Batches of ground beef so treated and stored within the temperature range of 34°–38° F. have retained excellent colors for periods ranging from eight to fourteen days.

It has been found that concentrations of ascorbic acid within the range of 0.01–0.1 percent, based on the weight of meat being treated, give satisfactory results. Concentrations less than 0.01 percent may be used but with somewhat decreasing efficiency and concentrations greater than 0.1% do not improve results sufficiently beyond those obtained where the recommended maximum (0.1%) is selected to justify their use. The use of the antibiotic in concentrations in excess of 15 p. p. m. does not greatly extend the color protection over that obtainable with lesser concentrations and the use of the antibiotic in concentrations less than the 5 p. p. m. recommended above may be used under certain circumstances but, ordinarily, with gradually decreasing efficiency.

In the treatment of meat cuts or whole carcasses, dusting may be employed to distribute the ascorbic acid and antibiotic on the surface of the meat being treated. The amount of treating material required varies with the effective distribution of the material.

The following examples illustrate the effectiveness of our method of processing and the advantages to be gained in the use of it. The color evaluations are those of a color panel made up of three individuals whose individual scores were averaged to give the color ratings shown. A scale reading of 8 or better is considered good, 7 is a borderline color, and all scale readings below 7 are considered unacceptable to the average consumer of meat.

In each of the first three examples, fresh beef trimmings were first coarse ground through a ¾ inch plate and then the antibiotic indicated with ascorbic acid was added. The meat was next subjected to a fine grind through an ⅛-inch plate, then packaged in fresh meat cellophane, and refrigerated immediately thereafter at temperatures of 34°–38° F. The fourth example is concerned with lamb ground in a similar manner.

In each of the first three examples, the antibiotic-ascorbic acid treated sample was compared to an untreated control (to which neither an antibiotic nor ascorbic acid was added) and to a sample treated solely with ascorbic acid added at a level of 0.05 percent based on weight of the ground meat. By the end of the second day, the untreated control had gone off color (7—). The ascorbic acid treated sample retained an acceptable color of 8 or better for four days, but by the fifth day it had faded to a color reading of 7, and on the seventh day it had a rating of 5—.

Example I

To a first portion of the ground beef Aureomycin alone was added in the concentration of 10 p. p. m., and to a second portion the same antibiotic was added in the amount of 10 p. p. m. together with 0.05 percent ascorbic acid based on weight of trimmings. The two samples had an initial color valuation of 9, and at the end of the first day each sample was judged to have a color reading of 8. At the end of the second day the Aureomycin sample was found to have an unacceptable color of 6, while the Aureomycin-ascorbic acid sample retained a color rating of 8. The Aureomycin-ascorbic acid sample continued through the tenth day with a color rating of 9—. On the eleventh day it had gone off color to give a scale reading of 7. It will be seen that the color protection available through the combined use of the antibiotic and ascorbic acid greatly exceeds that obtainable by addition of ascorbic acid alone which, as pointed out above, gave good color protection for only four days.

Example II

Oxytetracycline (commonly sold under the trademark Terramycin) (in an acid solution) and ascorbic acid were added to the samples of this example in the same quantities as the acid and the antibiotic were added in Example I. Again it was observed that the sample treated solely with the antibiotic went off color as soon as the untreated control. The Terramycin-ascorbic acid sample retained a good color (a color rating of 8) through the eleventh day. By the fourteenth day this sample had gone off color to give a scale reading of 7—.

Example III

The antibiotic chloramphenicol (commonly sold under the trademark Chloromycetin) and ascorbic acid were used in the same concentrations as employed in Example I. The Chloromycin-ascorbic acid sample retained a good color through the eighth day on which day it was found to have a scale reading of 9—. By the eleventh day this sample had gone off color to give a 5— reading. Again the sample containing only the antibiotic went off color by the second day.

*Example IV*

Two samples of freshly ground lamb were treated, respectively, with ascorbic acid and Aureomycin, and a third sample was treated with both Aureomycin and ascorbic acid. A fourth untreated control was prepared at the same time. The antibiotic was used in concentrations of 10 p. p. m. and the ascorbic acid was added at a level of 0.05 percent based on the weight of the meat. The four samples were refrigerated at 35° F. At the conclusion of the third day of refrigeration, the control and the sample treated solely with Aureomycin had both gone off color (7). The ascorbic acid treated sample retained an acceptable color of 9 for four days, and by the seventh day it had faded to a color reading of 7. The sample treated with both ascorbic acid and Aureomycin retained a good color to the eleventh day of refrigeration.

Obviously, many modifications and variations of the invention, as hereinbefore set forth, may be made without departing from the spirit and scope thereof, and therefore only such limitations should be imposed as are indicated in the appended claims.

We claim:

1. In an improved process for prolonging the color life of the oxy heme pigments of fresh meat in the presence of oxygen, the step comprising treating said meat with a small but perceptible quantity of an antibiotic selected from the group consisting of chlortetracycline, oxytetracycline, and chloramphenicol, and a small but perceptible quantity of a compound selected from the group consisting of ascorbic acid and its edible salts.

2. In an improved process for prolonging the color life of the oxy heme pigments of fresh meat, the step comprising treating said meat with a small but perceptible quantity of chlortetracycline and a small but perceptible quantity of a composition selected from the group consisting of ascorbic acid and its edible salts.

3. In an improved process for prolonging the color life of the oxy heme pigments of fresh meat, the step comprising treating said meat with a small but perceptible quantity of oxytetracycline and a small but perceptible quantity of a composition selected from the group consisting of ascorbic acid and its edible salts.

4. In an improved process for prolonging the color life of the oxy heme pigments of fresh meat, the step comprising treating said meat with a small but perceptible quantity of chloramphenicol and a small but perceptible quantity of a composition selected from the group consisting of ascorbic acid and its edible salts.

5. In an improved process for prolonging the color life of the oxy heme pigments of fresh meat in the presence of oxygen, the step comprising treating said meat with a small but perceptible amount of antibiotic, not in excess of about 15 p. p. m., selected from the group consisting of chlortetracycline, oxytetracycline, and chloramphenicol, and a composition selected from the group consisting of ascorbic acid and its edible salts in the amount of 0.01–0.1% of the selected composition based on the weight of the meat.

References Cited in the file of this patent

UNITED STATES PATENTS

| | | |
|---|---|---|
| 2,491,646 | Coleman et al. | Dec. 20, 1949 |
| 2,734,899 | Hollenbeck | Mar. 27, 1956 |

OTHER REFERENCES

"Food Technology," October 1949, pp. 332 to 336, inclusive, article entitled Antioxidants in the hemoglobin catalyzed oxidations of unsaturated fats.

"Food Industries," October 1950, page 126, article entitled Antibiotics effectively retard bacterial spoilage of fish.

"Food Manufacture," December 1950, pages 508 and 509, article entitled Meat preservation by antibiotics.

"Food Technology," September 1952, pages 363 to 366, inclusive, article entitled Experimental preservation of flesh foods with antibiotics.